US011966313B2

(12) United States Patent
Magri et al.

(10) Patent No.: US 11,966,313 B2
(45) Date of Patent: Apr. 23, 2024

(54) TELECOMMUNICATIONS APPARATUS AND CONTROL METHOD (71) Applicant: Telefonaktiebolaget LM Ericsson (publ), Stockholm (SE)

(72) Inventors: Roberto Magri, Genoa (IT); Alfonso Cirillo, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 185 days.

(21) Appl. No.: 17/616,766

(22) PCT Filed: Jun. 12, 2019

(86) PCT No.: PCT/EP2019/065417
§ 371 (c)(1),
(2) Date: Dec. 6, 2021

(87) PCT Pub. No.: WO2020/249212
PCT Pub. Date: Dec. 17, 2020

(65) Prior Publication Data
US 2022/0300391 A1 Sep. 22, 2022

(51) Int. Cl.
*G06F 11/32* (2006.01)
*H04L 41/06* (2022.01)
*H04Q 1/14* (2006.01)

(52) U.S. Cl.
CPC ............ *G06F 11/325* (2013.01); *H04L 41/06* (2013.01); *H04Q 1/148* (2013.01)

(58) Field of Classification Search
CPC ........ H04B 10/502; H04Q 1/13; H04Q 1/148; G06F 11/325
(Continued)

(56) References Cited

U.S. PATENT DOCUMENTS 8,953,941 B2 * 2/2015 Lutgen ................ H04B 10/272
398/67
10,225,628 B2 * 3/2019 Raza .................... G02B 6/4246
(Continued)

FOREIGN PATENT DOCUMENTS

EP          3168625 A1     5/2017
WO      2017082887 A1     5/2017

OTHER PUBLICATIONS

International Search Report and Written Opinion dated Feb. 25, 2020 for International Application No. PCT/EP2019/065417 filed Jun. 12, 2019, consisting of 11-pages.

*Primary Examiner* — Brian T Misiura
(74) *Attorney, Agent, or Firm* — Weisberg I.P. Law, P.A.

(57) ABSTRACT

A telecommunications apparatus including a lighting apparatus, the lighting apparatus having: a plurality of light sources, an illumination state of the light sources being controllable according to control signals; circuitry connected to the plurality of light sources, wherein the circuity is configured to provide control signals to the light sources; and a plug connected to the circuitry, wherein the plug is configured to connect to an external port of a first telecommunications device, and configured as an interface for control signals from the first telecommunications device to the circuitry. The plurality of light sources are arranged such that a change in illumination state of the plurality of light sources provides a visual indication on a subject telecommunications device. The telecommunications apparatus is configured to receive control signals from the first telecommunications device which correspond to an indication, by the plurality of light sources, relating to the subject telecommunications device.

19 Claims, 6 Drawing Sheets

(58) Field of Classification Search
USPC .................................................. 398/180–182
See application file for complete search history.

(56) References Cited

U.S. PATENT DOCUMENTS

| | | | |
|---|---|---|---|
| 10,264,332 B1* | 4/2019 | Sable | H04Q 1/24 |
| 11,603,038 B2* | 3/2023 | Pribula | B60Q 1/2696 |
| 11,818,233 B2* | 11/2023 | Narayanan | G06F 3/04817 |
| 2009/0051558 A1* | 2/2009 | Dorval | G08B 5/36 |
| | | | 340/815.45 |
| 2014/0218199 A1 | 8/2014 | Cepulis et al. | |
| 2015/0052272 A1* | 2/2015 | Malone | H04L 43/0811 |
| | | | 710/113 |
| 2023/0188210 A1* | 6/2023 | Ceccatelli | H04Q 11/0062 |
| | | | 398/38 |

* cited by examiner

TELECOMMUNICATIONS APPARATUS AND CONTROL METHOD

CROSS-REFERENCE TO RELATED APPLICATIONS

This application is a Submission Under 35 U.S.C. § 371 for U.S. National Stage Patent Application of International Application Number: PCT/EP2019/065417, filed Jun. 12, 2019 entitled "TELECOMMUNICATIONS APPARATUS AND CONTROL METHOD," the entirety of which is incorporated herein by reference.

TECHNICAL FIELD

The present disclosure lies in the field of telecommunications. In particular, the disclosure relates to lighting apparatus and to the control of lighting apparatus for telecommunications equipment.

BACKGROUND

Telecommunications devices are usually designed to provide alarms, warnings, monitoring status, maintenance status by means of fixed color LEDs in the chassis. This existing approach to the provision of visual information relating to the telecommunications device has several limitations:
- LEDs are available in active (i.e. powered) equipment only where control and electrical power supply is provided. Passive sub-racks do not have electrical power, and do not have means to provide such visual information. This strongly limits the installation and cabling of those equipment, increasing risk of misconnection, leading to time consuming troubleshooting;
- LED layout is fixed by design and often doesn't comply with every customer requirement;
- Equipment cost requirements, especially in the access network sector, tends to simplify the equipment layout reducing visual information;
- Equipment flexibility usually allow for changing of role of equipment ports, which makes it unfeasible to provide fixed or self-explicatory layout/visual information on the front-panel.

It is desirable to at least partially overcome one or more of the above limitations.

SUMMARY

Embodiments include a telecommunications apparatus comprising: lighting apparatus comprising: a plurality of light sources, an illumination state of the light sources being controllable according to control signals; and circuitry connected to the plurality of light sources, wherein the circuity is configured to provide electrical power, and control signals to the light sources; a plug connected to the circuitry, wherein the plug is configured to connect to an external port of a first telecommunications device, and configured as an interface for electrical power from the first telecommunications device to the circuitry, and for control signals from the first telecommunications device to the circuitry; the plurality of light sources are arranged such that a change in illumination state of the plurality of light sources provides a visual indication on a subject telecommunications device, wherein the subject telecommunications device is either the first telecommunications device or a second telecommunications device; wherein the telecommunications apparatus is configured to receive control signals from the first telecommunications device which correspond to an indication, by the plurality of light sources, relating to the subject telecommunications device.

Advantageously, embodiments provide an easy to install mechanism to provide additional visual information to a subject telecommunications device. For example, the subject telecommunications device may have no or limited capability for providing visual information via light emissions.

The lighting apparatus provides a portable troubleshooting device for field engineers who can have a visual summarization of system information or other information relating to the subject telecommunications device, communicated by the first telecommunications device or by another entity such as a system controller via the first telecommunications device.

Embodiments provide control signals to the light sources through wired cable which terminates in a pluggable electrical interface (e.g. an SFP form factor termination) which can be plugged in a free external port of an active equipment, the first telecommunications device. Control strategy and functionality is implemented by software on the first telecommunications device or a device connectable thereto (such as a system controller unit). Hence, embodiments enable the provision of visual information to a separate passive subrack (the subject telecommunications device) controlled by the first telecommunications device, a system controller unit, or any active unit in the system.

Optionally, the subject telecommunications device is a second telecommunications device, separate from the first telecommunications device, and the subject telecommunications device is a passive telecommunications device.

Passive telecommunications devices are not supplied with electrical power, and therefore have no means for changing illumination state of electronic light sources. A passive telecommunications device may be taken to be a telecommunications device comprising optical components for optical processing of input signals in the absence of electrical power consumption by the optical components. Furthermore, a passive telecommunications device may be taken to be a telecommunications device with optical components having a fixed configuration, by which fixed configuration is taken to be a configuration that is not configurable by external control signals.

Optionally, a passive telecommunications device is a telecommunications device comprising optical components for optical processing of input signals in the absence of electrical power consumption by the optical components. Optionally, the optical components have a fixed configuration, which fixed configuration is a configuration that is not configurable by external control signals.

Optionally, the indication relating to the subject communication device is an indication that a connector requires connection to, or disconnection from, a particular external port of the subject telecommunications device, as indicated by a light source from among the plurality of light sources.

Advantageously, the visual information provided by the light sources serves as a visual aid to guide the connecting and disconnecting of connectors among telecommunications devices. The potential for malfunctions caused by erroneous connections or disconnections is suppressed.

Optionally, the indication relating to the subject communications device is an indication that a connector requires, connection to, or disconnection from, a particular external port of the subject telecommunications device is a response to a connection to, or disconnection from, a corresponding external port of the first telecommunications device.

Advantageously, the sensing of connection or disconnection of a connector to/from an external port of the first telecommunications device automatically triggers a change in illumination state of a light source at or aligned with a corresponding external port at the subject telecommunications device. The field engineer or other operative responsible for executing connections and disconnections is provided with a visual guide to suppress the risk of erroneous connections/disconnections. The subject telecommunications device may be a second telecommunications device (i.e. separate from the first telecommunications device) and may be, for example, a passive subrack. An example of a passive subrack is an optical multiplexer.

Optionally, the indication relating to the subject telecommunications device is an indication of a status of the subject telecommunications device.

Advantageously, the illumination reflects a status of the second telecommunications device. Therefore, embodiments provide a mechanism for visualization of the status and condition of the subject telecommunications device. The indication of a status may be an indication of diagnostic information, and may enable fault isolation & resolution.

Optionally, the lighting apparatus is arranged such that a change in illumination status of each of the plurality of light sources is arranged to provide a visual indication on a different region of the subject telecommunications device, and each of the regions is aligned with an external port of the subject telecommunications device.

The subject telecommunications device may be a telecommunications subrack with multiple external ports. It is advantageous to utilise the lighting sources to provide visual information relating to a specific external port among the multiple external ports.

Optionally, the subject telecommunications device is a second telecommunications device separate from the first telecommunications device; and the indication relating to the subject telecommunications device indicates a status relating to an external port of the subject telecommunications device by indicating output of a signal from the first telecommunications device having a wavelength or other signal characteristic corresponding to the respective external port of the subject telecommunications device.

Such embodiments are particularly suited to implementation scenarios in which the second telecommunications device is a passive subrack, for example, an optical multiplexer. Advantageously, such embodiments provide a solution to reducing the incidence of erroneous connections in network entities in which proper network function is dependent upon connectors being connected to the correct ports, and no remote reconfiguration of connections is possible.

Optionally, correspondence between the indication relating to the second telecommunications device, and changes in illumination state of the plurality of light sources, is changeable via an interface at, or in communication with, the first telecommunications device.

Optionally, the interface is a graphical user interface on a display unit connected to the first telecommunications device, or on a device in communication with the first telecommunications device, and the configuration via the interface comprises identifying a part number or model number of the subject telecommunications device.

Advantageously, such a configuration procedure enables a lighting apparatus to be provided which is configured for operation in multiple different implementation scenarios. Wherein an implementation scenario may be a particular subject telecommunications device and/or in a particular placements (i.e. spatial relation of light sources to subject telecommunications device). The configuration procedure, which may be referred to as a calibration, effectively constrains the lighting apparatus to function with a particular subject telecommunications device and/or in a particular spatial relation to the subject telecommunications device. The lighting apparatus may also be re-configured for deployment in a further, different, implementation scenario.

Optionally, the plurality of light sources are mounted on a substrate, and the substrate is adapted for direct attachment to the second telecommunications device, such that each of a series of external ports on the second telecommunications device aligns with one or more light sources from among the plurality of light sources.

Advantageously, such embodiments provide light sources such as LEDs to impart visual information on a subject telecommunications device by means of substrate-mounted light sources such as LED strips applied to the equipment via adhesive. Embodiments leverage a cost-effective technology to provide the capability to add visual information to a subject telecommunications device. LEDs can be easily customized in any layout/combination form and applied on the equipment chassis or front panel as desired.

Optionally, the plurality of light sources is one or more projectors configured to controllably illuminate a different respective region of the subject telecommunications device.

Advantageously, such embodiments provide a mechanism to provide visual information to a subject telecommunications device to which it is not feasible to directly attach light sources.

Embodiments of another aspect include a method for the control of a telecommunications apparatus comprising: a plurality of light sources, an illumination state of the light sources being controllable according to control signals; and circuitry connected to the plurality of light sources, wherein the circuity is configured to provide electrical power, and control signals to the light sources; a plug connected to the circuitry, wherein the plug is configured to connect to an external port of a first telecommunications device, and configured as an interface for electrical power from the first telecommunications device to the circuitry, and for control signals from the first telecommunications device to the circuitry. The method comprises: arranging the plurality of light sources such that a change in illumination state of the plurality of light sources provides a visual indication on a subject telecommunications device, wherein the subject telecommunications device is either the first telecommunications device or a second telecommunications device; initiating issuance of control signals to the plurality of light sources, via the plug, which correspond to an indication, by the plurality of light sources, relating to the subject telecommunications device.

Embodiments of another aspect include a computer program which, when executed by a processor causes the processor to perform a method for initiating issuance of control signals to a telecommunications apparatus comprising: a plurality of light sources, an illumination state of the light sources being controllable according to control signals; and circuitry connected to the plurality of light sources, wherein the circuity is configured to provide electrical power, and control signals to the light sources; a plug connected to the circuitry, wherein the plug is configured to connect to an external port of a first telecommunications device, and configured as an interface for electrical power from the first telecommunications device to the circuitry, and for control signals from the first telecommunications device to the circuitry; the plurality of light sources are arranged such that a change in illumination state of the plurality of light sources provides a visual indication on a subject telecommunications device, wherein the subject telecommunications device is either the first telecommunications device or a second telecommunications device; the method comprising: initiating issuance of control signals to the plurality of light sources, via the plug, which correspond to an indication, by the plurality of light sources, relating to the subject telecommunications device.

BRIEF DESCRIPTION OF THE FIGURES

Embodiments will now be described, purely by way of example, with reference to the accompanying drawings, in which:—

DETAILED DESCRIPTION

Figure 1:
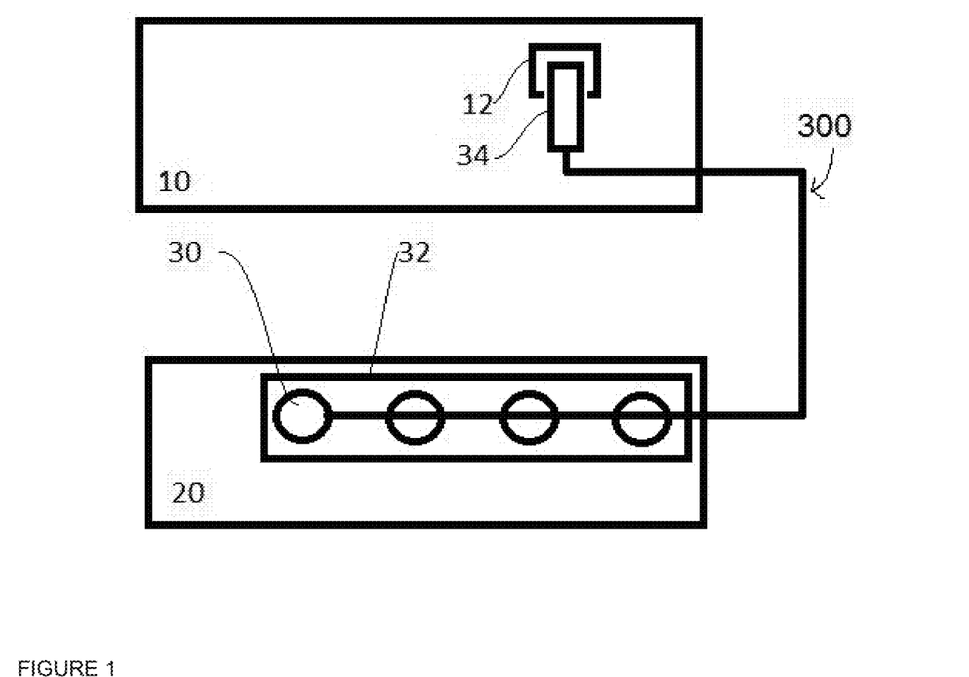
FIG. 1 illustrates a telecommunications apparatus of an embodiment.

FIG. 1 illustrates a telecommunications apparatus 300. The telecommunications apparatus 300 comprises a plurality of light sources 30, circuitry 32 connected to the plurality of light sources, and a plug 34 configured to connect to an external port 12 of a first telecommunications device 10. In the example of FIG. 1, the plurality of light sources 30 are arranged on a second telecommunications device 20, which is an example of a subject telecommunications device. As such, the subject telecommunications device can provide visual indications to a user, by means of the telecommunications apparatus 300. The visual indications relate to the subject (second) telecommunications device, even though the telecommunications apparatus 300 is not controlled through the second telecommunications device 20. Instead, the telecommunications apparatus 300 is controlled by a separate telecommunications device, in this case the first telecommunications device 10.

The plurality of light sources 30 are arranged to provide a visual indication on the second telecommunications device 20 by changing their illumination state. The light sources 30 may be electronic light sources.

A visual indication may be provided on the second telecommunications device 20 by causing light to be reflected from or transmitted from a light source placed on (or near), a surface of the device. Said visual indication may be provided, for example, by shining light toward the device, which is then reflected by a surface of the device, or by transmitting light from a light source (light emitter) affixed, adhered, or otherwise connected to, the device. Providing a visual indication includes transmitting light at the second communications device from a light source, or by transmitting light from a light source on a surface of the second communications device.

The plurality of light sources 30 may be any suitable light emitters, such as a projector or projectors, light bulbs, or light emitting diodes. Each light source may comprise more than one light bulb or light emitting diode in a single package or cover, for example, each emitting light of a different wavelength (within the visible spectrum). In some examples, this allows generation of different colours by mixing of light from more than one light emitter.

The illumination state of the plurality of light sources 30 is controlled according to control signals received via the circuitry 32. The circuitry 32 is configured to provide electrical power and control signals to the plurality of light sources 30. The circuitry 32 may include wiring. The circuitry 32 may also include processing circuitry, a computer, controller or microcontroller for receiving input control signals from the plug 34 and converting the input control signals to control signals for controlling the plurality of light sources 30.

In some examples, the circuitry comprises a computer or microcontroller for each individual light source or each individual package of light sources, for converting received control signals into a visual indication on the subject telecommunications device by the respective light source or package of light sources. Alternatively, the input control signals received from the plug 34 may be transmitted directly to the plurality of light sources 30 by the circuitry 32. The input control signals received from the plug 34 may be configured to directly control the plurality of light sources 30.

The plug 34 is connected to the circuitry 32. The plug 34 is configured to connect to an external port 12 of a first telecommunications device 10. The first telecommunications device 10 is active, that is, it has an electrical power supply. In this example, the first telecommunications device 10 includes one or more external ports for outputting electrical power and control signals. The plug 34 is configured as an interface for electrical power and control signals from the first telecommunications device 10 to the circuitry 32. The telecommunications apparatus 300 is configured to selectively supply electrical power to one or more light sources among the plurality of light sources 30 by the circuitry 32. The plug 34 is configured as an interface for control signals from the first telecommunications device 10 to the circuitry 32. The control signals are control signals according to which an illumination state of the plurality of light sources 30 is controllable.

The control signals provided to the plurality of light sources 30 by the circuitry 32 may be the same control signals as those received by the circuitry 32 at the plug 34. Even if the circuitry 32 includes a microcontroller or computer for converting or otherwise altering the form of a control signal between the plug 34 and the light sources 30, the control signal(s) received by the light sources 30 are considered to be [AB1] based on the control signal(s) received by the plug 34.

The plug 34 has a form configured for connection to an external port 12 of the first telecommunications device 10. For example, the plug 34 may be an SFP (small form-factor pluggable) plug, a QSFP (quad small form-factor pluggable) plug, an OSFP (octal small form-factor pluggable) plug, an SFP+(enhanced small form-factor pluggable) plug, a cSFP (compact small form-factor pluggable) plug, an SFP-DD (small form-factor pluggable double density) plug, an XFP (10 Gigabit small form-factor pluggable) plug, or an Ethernet plug.

Further embodiments include the plurality of light sources 30 being arranged to provide a visual indication on the first telecommunications device by changing their illumination state. For example, the plurality of light sources 30 could be arranged on, or arranged to illuminate, the first telecommunications device 10. The electrical power and control signals are also from the first telecommunications device 10, using the plug 34 as described above. As such, the telecommunications apparatus 300 is configured with an external plug, such that the telecommunications apparatus 300 can be added to, or removed from, the first telecommunications device 10.

The first telecommunications device 10 may be an active subrack, such as a network switch, router, or other core or edge network entity in a telecommunications network. For example, the first telecommunications device 10 may be configured to process and transceive data being transferred in a telecommunications network. The first telecommunications device 10 is an active, i.e. powered, device. In some examples, the first telecommunications device 10 is an optical network device, e.g. comprises optical input and output ports, and/or optical processing equipment. The first telecommunications device 10 being an active device may be taken to mean that the first telecommunications device comprises an input for receiving electrical power from a power source, and further comprises one or more components configured to consume the received electrical power, e.g. optical processing equipment. Consuming received electrical power in this context is taken to mean transfer to another form of energy. The first and second telecommunications devices may be telecommunications devices forming part of an access network, e.g. a fixed access network or a radio access network. The first telecommunications device may comprise a surface with one or multiple external ports.

The subject telecommunications device, on which a visual indication is provided by the illumination state of the light sources 30 may be the first telecommunications device 10 or may be the second telecommunications device 20. In some examples, the second telecommunications device 20 may be an active, i.e. powered, device. For example, the second telecommunications device 20 may be a network switch, or other core or edge network entity in a telecommunications network. The telecommunications apparatus 300 receives control signals, relating to indications on the second telecommunications device 20, from the first telecommunications device 10. The second telecommunications device 20 may be configured to process and/or transceive data being transferred in a telecommunications network.

The second telecommunications device 20 may be a passive telecommunications device, that is, not powered. As such, all components of the passive telecommunications device are passive, i.e. not powered. For example, the second telecommunications device 20 may comprise passive filters, e.g. in the form of a passive filter subrack. The second telecommunications device 20 may be configured to perform signal processing at the optical layer. For example, the second telecommunications device may be arranged to perform optical transformation of input signals, which optical transformation may be one or more from among: filtering, multiplexing, de-multiplexing, optical blocking, adding wavelengths together from plural signals, multiplying wavelengths from plural signals. The plug 34 is adapted for connection to an external port 12 configured for connecting the first telecommunications device 10 to, for example, a network switch. In some examples, the second telecommunications device 20 comprises a passive optical device, e.g. comprising passive optical components. The second telecommunications device 20 is configured to be connected to an active optical device, e.g. the first telecommunications device 10. The second telecommunications device may comprise a surface with multiple external ports.

The second telecommunications device 20 may be a passive telecommunications device, i.e. a telecommunications device comprising optical components for optical processing of input signals in the absence of electrical power consumption by the optical components. The optical components may have a fixed configuration, which fixed configuration is a configuration that is not configurable by external control signals.

The second telecommunications device 20 requires that input and/or output connections are made with the correct ports of the second telecommunications device 20. For example, the second telecommunications device 20 may be configured such that the optical transformation of an input signal or signals performed by the second telecommunications device 20 is dependent upon from which external port(s) of the device 20 the signal or signals are received. Proper operation of the telecommunications network to which the second telecommunications device 20 belongs, may be to some degree dependent upon connectors being connected to (i.e. signals being input to) the correct external ports of the second telecommunications device 20. It is the nature of passive telecommunications devices that re-configuration of input signals to external ports cannot be performed remotely. In some examples, the second telecommunications device 20 may be a passive subrack comprising multiple external ports, each external port configured to receive a signal of a predefined wavelength.

The plurality of light sources 30 are arranged such that a change in illumination state of the plurality of light sources causes a visual indication to be provided on the subject telecommunications device. For example, the plurality of light sources 30 may be attached or affixed to an exterior of the subject telecommunications device, such as via adhesion to a surface or by mechanical fastening devices, e.g. screws. Alternatively, the plurality of light sources 30 may be arranged to illuminate the subject telecommunications device, for example, via projection. A visual indication may be provided by changing the momentary visual appearance of the device. The visual appearance of a device is temporally dynamic.

The change in illumination state of the light sources 30 provides a visual indication relating to the subject telecommunications device, for example, by transmitting light at the subject telecommunications device, or by being placed or connected on or to the subject telecommunications device and transmitting light (to an observer). Controlling the illumination state of the light sources includes one or more from among:

switching on or off a selected light source or light sources among the plurality of light sources 30;

Selectively changing the intensity of light emitted by a selected light source or light sources among the plurality of light sources 30;

Selectively changing the wavelength of light emitted by a selected light source or light sources among the plurality of light sources 30;

Implementing a selected temporal pattern of illumination (such as flashing) by a selected light source or light sources among the plurality of light sources 30.

The telecommunications apparatus 300 is configured to receive control signals from the first telecommunications device 10 which correspond to an indication, by the plurality of light sources 30, relating to the subject telecommunications device. The control signals are the control signals according to which the illumination state of the light sources 30 is controllable. So, the illumination state of the plurality of light sources 30 is controlled by the control signals received by the telecommunications apparatus 300 from the first communications device which correspond to an indication, by the plurality of light sources, relating to the subject telecommunications device. For example, the control signals received via the first communications device provide information, e.g. external port identification, relating to the second communications device. The control signals received by the telecommunications apparatus 300 are received via the plug 34 and transmitted to the light sources 30 via the circuitry 32.

The control signals may be output to the plug 34 by the first telecommunications device 10 under the control of a computer program running on the first telecommunications device 10. The control signals may be output to the plug 34 by the first telecommunications device 10 under the control of a computer program running on a network node communicatively coupled (i.e. in data communication with) the first telecommunications device.

The control signals change the illumination state of the light sources 30, thereby providing a visual indication on the subject telecommunications device. For example, the visual identification identifies a faulty port, good connection, or a port for connection/disconnection of a plug, on the subject telecommunications device. Hence, the control signals cause the appearance of the subject telecommunications device to be changed. The control signals thereby augment any visual information able to be communicated from the subject telecommunications device itself. For example, this may be particularly useful in scenarios in which the visual information that can be communicated from the subject telecommunications device itself is non-existent, or constrained, either by having limited hardware for doing so, or by virtue of being passive and therefore having no power supply to provide electrical power to visual information mechanisms. A change in illumination state of the telecommunications apparatus 300 causes illumination, by visible light, of or from a portion of the subject telecommunications device, and thereby provides a visual indication on the subject telecommunications device.

The indication relating to the subject telecommunications device with which the control signals correspond may be, for example, that a connector is pending connection to the subject telecommunications device. Alternatively, the indication may be an indication of a status of the subject telecommunications device. Said status may be, for example, a functional status. In some examples, the control signals indicate one or more external ports, e.g. one or more input and/or output ports. The control signals may indicate a status, intended connection or other information for one or more of the external ports, or for the device as a whole. In some examples, the light sources are configured to provide visual information to an engineer relating to the device and/or ports of the device, to assist with the installation, upgrade or repair of the device. In some aspects, the visual information is provided for a telecommunications device which does not have a built-in visual display. This provides for improved operation, especially maintenance, repair or upgrade of a device which was not installed with a visual display. For example, the telecommunications device may be an active device without a built-in display, or may be a passive device which does not have a built-in display or even an electrical power supply.

Figure 2:
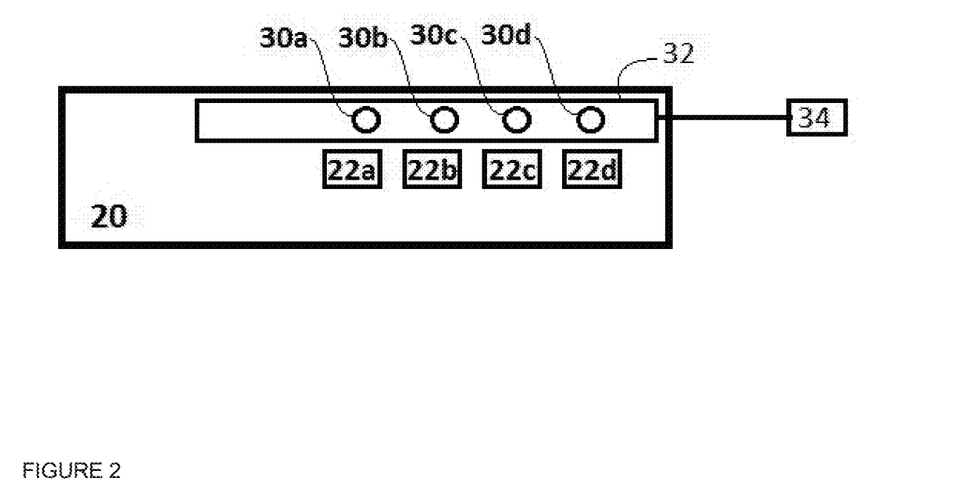
FIG. 2 illustrates an embodiment of the telecommunications apparatus arranged relative to a second telecommunications device.

FIG. 2 illustrates an embodiment of the telecommunications apparatus 300. The first telecommunications device 10 is excluded from FIG. 2, but the plug 34 is connectable to an external port 12 of a first telecommunications device, as described in relation to FIG. 1. FIG. 2 illustrates an arrangement in which the plurality of light sources 30 is a series of linearly spaced light sources 30a-30d. For example, each light source 30a-30d is one or more LED. In the arrangement of FIG. 2, the subject telecommunications device is a second telecommunications device 20, and the second telecommunications device 20 has a plurality of external ports 22a-22d. For example, and as illustrated, the plurality of external ports 22a-22d may be linearly spaced on a surface of the second telecommunications device 20.

In the example of FIG. 2, the light sources 30 are arranged such that a change in illumination status of each of the plurality of light sources 30a-30d is arranged to provide a visual indication to or from a different respective region of the subject telecommunications device, and each of the respective regions is aligned with an external port 22a-22d of the subject telecommunications device. In particular, the telecommunications apparatus 300 comprises light sources 30a-30d which are arranged to align or match (in the direction of the line along which the external ports are spaced) with respective external ports 22a-22d of the subject telecommunications device. Thus, each light source is configured to indicates a status, or identifies, one or more ports.

For example, the light source 30a-30d for providing a visual indication to or from a region aligned with a particular external port may be illuminated when a connector requires connection to, or disconnection from, the particular external port 22a-22d of the subject telecommunications device. For example, such illumination may be controlled by a control program running on the first telecommunications device or a connected controller, and, for example, may be in response to a connection of a connector to, or disconnection from, a corresponding external port of the first telecommunications device.

Figure 3:
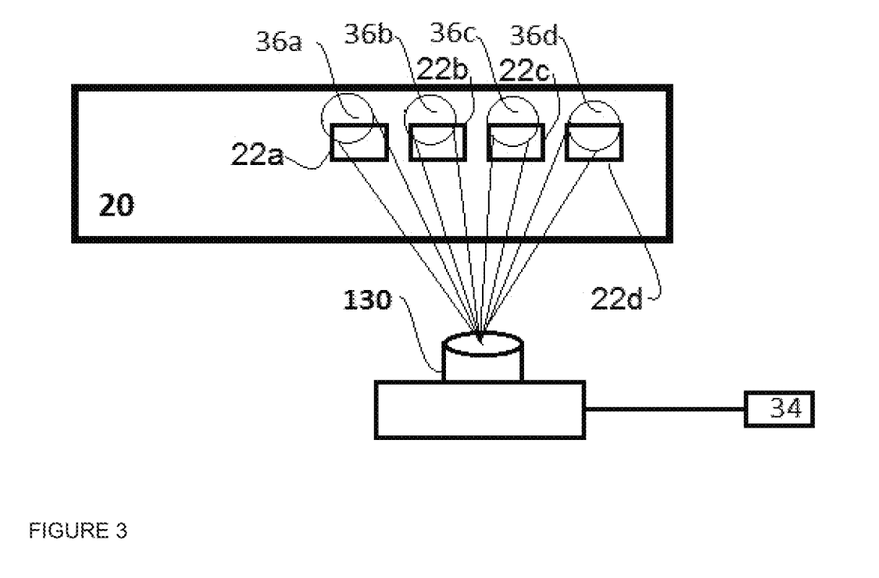
FIG. 3 illustrates an alternative embodiment of the telecommunications apparatus arranged relative to a second telecommunications device.

FIG. 3 illustrates an alternative arrangement to that of FIG. 2. In the alternative of FIG. 3, the plurality of light sources are provided by a projector 130 configured to project a plurality of beams of visible light 36a-36d at the subject telecommunications device. The projector 130 may or may not be attached to the subject telecommunications device. In the particular arrangement of FIG. 3, the plurality of beams of visible light 36a-36d are linearly spaced on a surface of the second telecommunications device 20, and each transmits light at a different external port 22a-d of the second telecommunications device. Each light beam 36a-36d is projected by a different light source among the plurality of light sources 130. It is noted in this regard that there may be a plurality of separate light emitters, optionally each with respective beam forming optics, to generate a respective beam 36a-36d. Alternatively, there may be a single light emitter, such as a bulb, with beam forming optics to generate the plurality of beams 36a-36d. The beams 36a-36d are incident on the second telecommunications device 20. Therefore, in the context of a light projecting device 130, the plurality of light sources may be provided by respective individual light emitters, optionally with respective individual beam forming optics, or the plurality of light sources may be provided by a single light emitter with beam forming optics to form the plurality of light sources.

The second telecommunications device 20 has a plurality of external ports 22a-22d. For example, and as illustrated, the plurality of external ports 22a-22d may be linearly spaced on a surface of the second telecommunications device 20.

In the example of FIG. 3, the light projecting device 130 is arranged such that a change in illumination state of each of the plurality of light sources corresponds to a change in the illumination state of a beam 36a-36d, which provides a visual indication to or from a different region of the subject telecommunications device. As shown in FIG. 3, each of the regions is aligned with an external port 22a-22d of the subject telecommunications device. In particular, the light beams 36a-36d are arranged to align or match (in the direction of the line along which the external ports are linearly spaced) with respective external ports 22a-22d of the subject telecommunications device.

In the arrangements of both FIGS. 2 & 3, owing to the alignment between the external ports 22a-22d and the light sources 30a-30d or light beams 36a-36d, a change in illumination state of a particular light source provides a visual indication on a region of the subject telecommunications device that spatially (and hence visually) corresponds to a particular external port 22a-22d. Therefore, the indication relating to the subject telecommunications device which corresponds with a control signal, may be an indication relating to a particular external port 22a-22d of the subject telecommunications device. Such a control signal is to change the illumination state of the spatially corresponding light source.

In the arrangements of both FIGS. 2 & 3, the indication relating to the subject communication device may be an indication that a connector requires connection to, or disconnection from, a particular external port 22a-22d of the subject telecommunications device, as indicated by a light source from among the plurality of light sources.

In the arrangements of both FIGS. 2 & 3, the indication relating to the second telecommunications device may indicate a status relating to an external port of the second telecommunications device 20 by indicating an input and/or output of a signal from the first telecommunications device 10 having a wavelength or other signal characteristic corresponding to the respective external port of the second telecommunications device 20. For example, it may be that each external port of the second telecommunications device 20 is configured to receive a signal of a particular wavelength range. The indication relating to the subject telecommunications device is the output of a signal from the first telecommunications device (or another interconnected device) with a wavelength in the range for a particular external port 22a-22d. The control signal received by the lighting apparatus from the first telecommunications device 10 in that case is to change the illumination state of the light source spatially corresponding to said particular external port 22a-22d.

Figure 4:
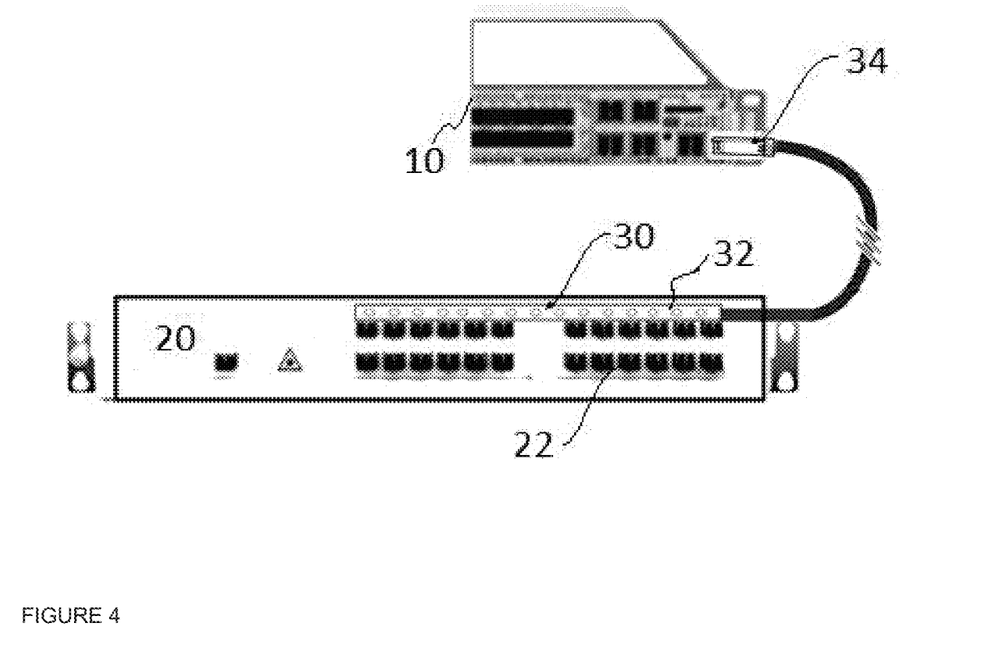
FIG. 4 illustrates a further embodiment.

FIG. 4 illustrates an embodiment of the telecommunications apparatus 300. Entities attributed reference signs can be assumed to be exemplary of entities attributed like reference signs in other embodiments. In the particular embodiment of FIG. 4, the first telecommunications device 10 has a plurality of external ports, one or more of which are configured to receive the plug 34. The subject telecommunications device is the second telecommunications device 20, which also has a plurality of external ports 22. The plurality of light sources 30 are mounted on a substrate, and the substrate is adapted for direct attachment to the second telecommunications device 20, such that each of a series of external ports 22 on the second telecommunications device 20 aligns with one or more light sources from among the plurality of light sources 30. The direct attachment may be, for example, via an adhesive layer or mechanical attachment on a surface of the substrate opposing the side on which the light sources 30 are mounted.

In the embodiments of FIGS. 1, 2, and 4, the lighting apparatus may be an LED strip whose control and power supply wires are terminated in pluggable electrical interface suitable for plugging into an external port of telecommunications equipment. In the embodiment of FIG. 3, the lighting apparatus is a projector or projectors for projecting visible light, whose control and power supply wires are terminated in a pluggable electrical interface suitable for plugging into an external port of telecom equipment. In the embodiments of any of FIGS. 1 to 4, an exemplary form of pluggable electrical interface (plug) is SFP (small form-factor pluggable). In the embodiments of any of FIGS. 1 to 4, the pluggable electrical interface 34 is plugged on an active subrack 10 part of a telecommunications system (which active subrack 10 can be the same subrack to which the LED strip is applied or onto which light is projected, or they can be applied to, or light can be projected onto, a separate external active or passive subrack).

The pluggable electrical interface 34 provides the lighting apparatus with control and supply signal. For example, the control signals may be controlled by the u-controller or processor equipped on the host active subrack (i.e. the first telecommunications device 10) where the application-level software can be programmed to provide the required serviceability information as indications relating to the subject telecommunications device via the lighting apparatus, according to information relating to the subject telecommunications device such as the equipment configuration, system feature, host subrack function, etc.

The first telecommunications device 10 and/or the second telecommunications 20 device may form part of the telecommunications apparatus 300 of an embodiment. The control signals that change illumination states of the plurality of light sources 30 may be initiated by a computer program. For example, the computer program may store correspondences between trigger events, such as receipt or determination of information relating to the subject telecommunications device, and how to change the illumination states of which light sources (i.e. which control signals to initiate) in response. The computer program may be stored on and executed by the first telecommunications device, or another network entity connected thereto, such as a network controller. The first telecommunications device may comprise a memory configured to store the computer program, and a processor configured to execute the computer program.

In FIG. 4, an exemplary implementation is shown in which a strip of LEDs 30 is used to provide a passive optical multiplexer (an example of a subject telecommunications device and second telecommunications device) with visual information, via control signals received by the plug 34 from the first telecommunications device 10, which is an active unit. The pluggable electrical interface 34 is plugged in the main controller shelf (e.g. the transponder shelf) of the first telecommunications device 10 using an SFP port 12 available for operation and maintenance purposes. Control signals which change an illumination state of the lighting apparatus are received by the lighting apparatus.

With the embodiment of FIG. 4, LEDs are affixed to the optical multiplexer 20 (i.e. second telecommunications device) and serve to highlight the ports where the corresponding transceiver is equipped on the transponder shelf. In this example, the indication relating to the subject communication device is an indication that a connector requires connection to, or disconnection from, a particular external port of the subject telecommunications device, as indicated by a light source aligned with the particular external port. For example, said indication may be triggered by a connection to, or disconnection from, a corresponding external port of the first telecommunications device. The connection or disconnection may be detected by the first telecommunications device, and/or another network entity with software configured to issue control signals, or to initiate to the issuance of control signals, to the lighting apparatus via the plug 34. Said control signals change an illumination state of the light sources, and hence provide visual information to an observer, such as a field engineer. This way, the field engineer has a clear visual information of which ports of the multiplexers need to be connected speeding up installation and reducing chance of mis-connection.

The indication relating to the passive subrack may be, for example, an alarm relating to the functionality of the passive subrack, as detected by the first telecommunications device 10 or another network entity connected thereto, which detection causes (according to application level software running on the network entity) a control signal to be issued to the light sources 30, which changes an illumination state of the light sources, and hence provide visual information to an observer, such as an engineer. In some examples, the engineer has a communication device which is configured to communicate with the network entity generating the control signals for the plurality of light sources. The communication device may be a local telecommunications device (e.g. first telecommunications device) or may be a separate device which may or may not be connected to the same network as the telecommunications device(s). For example, the field engineer may use a wireless device connected to a cellular network to separately communication with the network entity controlling the visual indications. The communication device of the engineers may send communication signals which trigger control signals for the light sources. For example, the communication device of the engineer may transmit a signal triggering a control signal, e.g. indicating an external port to install or remove a connection, or an external port to check a status.

Correspondence between the indication relating to the second telecommunications device, and changes in illumination state of the plurality of light sources, is changeable via an interface at, or in communication with, the first telecommunications device or other network device. The configuration of said correspondence may be referred to as a calibration. Optionally, the interface is a graphical user interface on a display unit connected to the first telecommunications device 10, or on a device in communication with the first telecommunications device 10, and the configuration via the interface comprises identifying a part number or model number of the subject telecommunications device.

Lighting apparatus operation can be calibrated via an interface on the first telecommunications device 10 or another network entity in data communication therewith. For example, software which determines or selects which control signals to issue (which light sources to change the illumination state of, and how to change the illumination state) to the light sources 30, in response to which information relating to the subject telecommunications device, may require calibration depending on one or more from among: the placement of the light sources 30, the model number or other information indicating the configuration of the subject telecommunications device, the configuration and/or functionality of the subject telecommunications device, the form of the plug 34. The calibration may be performed by an interface on a Local Equipment Controller or Network Management System or SDN controller, or on the first telecommunications device.

Figure 5:
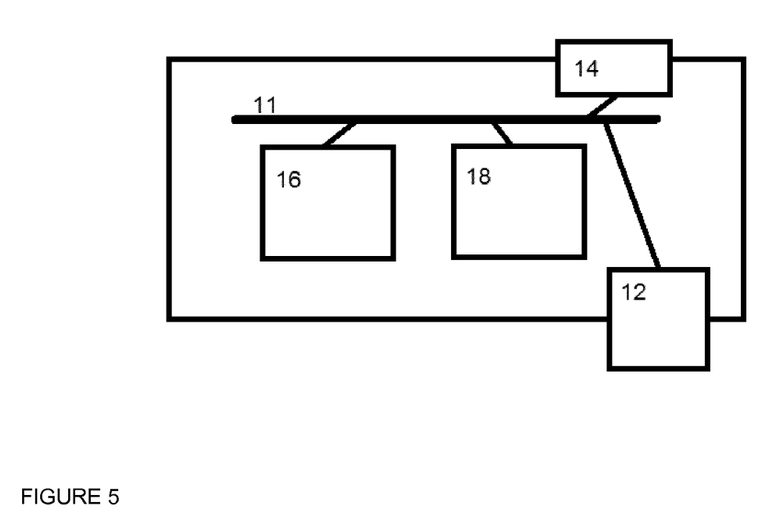
FIG. 5 illustrates a first telecommunications device.

FIG. 5 illustrates an example of telecommunications apparatus 300 or telecommunications device comprising a computing device executing a computer program. The device 10 includes memory circuitry 16, processing circuitry 18, a power supply 14, and an external port 12. The external port may output signals/power to the light sources 30 or control signals to the telecommunications apparatus 300. Interconnections between the components are illustrated as via a bus connection 11. This is representative only, and connections may be direct, or may be via one or more further intermediate components. Connections may be for the transfer of data, electrical power, or both. The illustrated connections are not exclusive of other logical and communication links between the components in the device 10.

Figure 6:
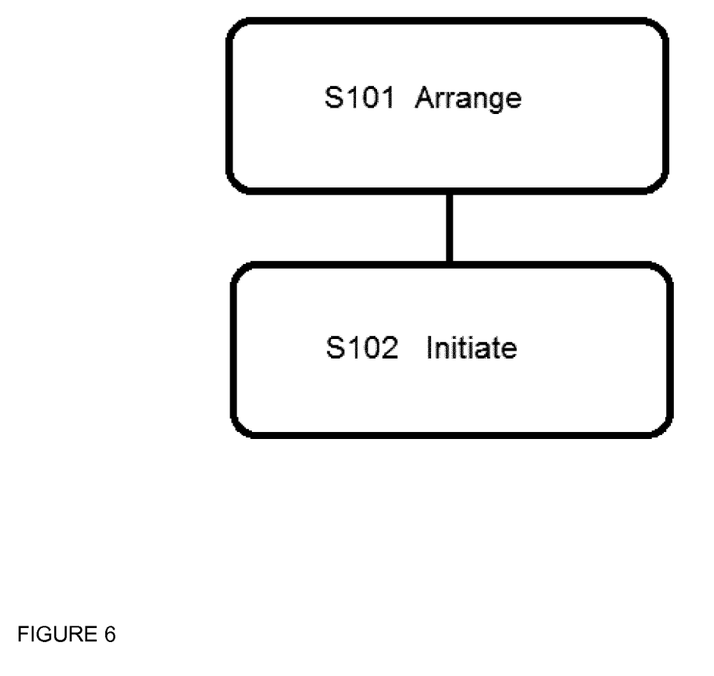
FIG. 6 illustrates a method according to an example of the disclosure.

FIG. 6 illustrates a method for the control of a telecommunications apparatus 300 of an embodiment. At S101, a telecommunications apparatus 300 according to an embodiment, for example as illustrated in any of FIGS. 1 to 4, is arranged such that a change in illumination state of the plurality of light sources provides a visual indication on a subject telecommunications device, wherein the subject telecommunications device is either the first telecommunications device 10 or a second telecommunications device 20. For example, the arrangement may be performed by an operative such as a service engineer. The arrangement may be guided by an interface on the first telecommunications device 10, on a device connected thereto, or an independent device such as a laptop running maintenance software.

At S102, the issuance of control signals is initiated. The control signals are issued to the plurality of light sources, via the plug, which correspond to an indication, by the plurality of light sources, relating to the subject telecommunications device. S102 may be performed by a computer program running on the first telecommunications device 10, or on a device connected thereto, such as a network controller. The issuance of control signals may be initiated in response to a trigger event, such as determination of, or receipt of, information relating to the subject telecommunications device. The issuance of control signals may be initiated in response to a step being reached in a maintenance process requiring visual information to be provided to the subject telecommunications device. The control signals are the control signals that control the illumination state of the light sources 30, and are received by the light sources via the plug 34 and circuitry 32.

The computing device of FIG. 5 may perform step S102 of the method of FIG. 6, for example, upon execution of suitable instructions from a computer program stored by the memory circuitry 16 and running on the processing circuitry 18. The computing device may for example be the first telecommunications device, which may be an active subrack operating as part of, or connected to, a core network, an edge network, a base station, or another radio access node. Alternatively, the computing device may be a control apparatus or some other network node operable to transmit or forward control signals which are received by the plurality of light sources 30. The memory circuitry 16 stores instructions executable by the processing circuitry 18 such that the computing device is operative to conduct step S102 of FIG. 6. It is noted that S102 of FIG. 6 may be executed by a device such as a network controller, and the control signals transmitted to the light sources 30 via the external port 12 of the first telecommunications device 10. In such embodiments, the memory circuitry 16 and processing circuitry 18 may store and perform processing instructions for converting a control signal received at the first telecommunications device 10 from the network controller into a form configured for issuance to the light sources 30 via the external port 12. The instructions may also include instructions for executing one or more telecommunications and/or data communications protocols. The instructions may be stored in the form of a computer program on the memory 16 or otherwise accessible to the processor 18. In some examples, the processor or processing circuitry 18 may include one or more microprocessors or microcontrollers, as well as other digital hardware, which may include digital signal processors (DSPs), special-purpose digital logic, etc. The processor or processing circuitry 18 may be implemented by any type of integrated circuit, such as an Application Specific Integrated Circuit (ASIC), Field Programmable Gate Array (FPGA) etc. The memory 16 may include one or several types of memory suitable for the processor, such as read-only memory (ROM), random-access memory, cache memory, flash memory devices, optical storage devices, solid state disk, hard disk drive etc. The power supply 14 is an input for receiving electrical power from a power source, and one or more of the memory circuitry 16 and processing circuitry 18 is configured to consume the received electrical power. The received electrical power is supplied to the light sources 30 via the external port 12. The external port 12 is configured to receive the plug 34, via which plug 34 electrical power and control signals to change the illumination state of the light sources 30 are supplied to the light sources 30.

Embodiments may provide one or more of the following advantages:
Serviceability enhancement;
Customization: tailoring LED configuration and signalling to customer requirements;
Introduce new LED signalling after design, after deployment;
Adaptable to multi-vendor scenario;
Enable visual service information on passive sub-racks (e.g. optical filters);
Adapt changes in illumination state to new released functionalities;
Reduce cost and simplify manufacturing of subracks/Chassis/Units;
Provide a portable troubleshooting visual information mechanism for service engineers (Plug, Play & remove).

LIST OF REFERENCE SIGNS:

10 first telecommunications device
11 bus connection
12 external port (first telecommunications device)
14 power supply
16 memory circuitry
18 processing circuitry
20 second telecommunications device
22a-22d external port (second telecommunications device)
30 plurality of light sources
30a-30d plurality of light sources
32 circuitry
34 plug
36a-36d light beam
130 projector

The invention claimed is:
1. A telecommunications apparatus comprising:
a lighting apparatus comprising:
a plurality of light sources, an illumination state of the light sources being controllable according to control signals; and
circuitry connected to the plurality of light sources, the circuity being configured to provide electrical power and control signals to the light sources;
a plug connected to the circuitry, the plug being configured to connect to an external port of a first telecommunications device, and configured as an interface for electrical power from the first telecommunications device to the circuitry, and as an interface for control signals from the first telecommunications device to the circuitry;
the plurality of light sources being arranged such that a change in illumination state of the plurality of light sources provides a visual indication on a subject telecommunications device, the subject telecommunications device being a second telecommunications device, separate from the first telecommunications device, the second telecommunications device being a passive telecommunications device that is not supplied with electrical power;
the telecommunications apparatus being configured to receive control signals from the first telecommunications device which correspond to an indication, by the plurality of light sources, relating to the subject telecommunications device.

2. The telecommunications apparatus according claim 1, wherein the indication relating to the subject telecommunications device is an indication that a connector requires connection to, or disconnection from, a particular external port of the subject telecommunications device, as indicated by a light source from among the plurality of light sources.

3. The telecommunications apparatus according claim 2, wherein the indication relating to the subject telecommunications device is an indication that a connector requires connection to, or disconnection from, a particular external port of the subject telecommunications device, and is a response to a connection to, or disconnection from, a corresponding external port of the first telecommunications device.

4. The telecommunications apparatus according claim 1, wherein the indication relating to the subject telecommunications device is an indication of a status of the subject telecommunications device.

5. The telecommunications apparatus according claim 1, wherein the lighting apparatus is arranged such that a change in illumination status of each of the plurality of light sources is arranged to provide a visual indication on a different region of the subject telecommunications device, and each of the regions is aligned with a different external port of the subject telecommunications device.

6. The telecommunications apparatus according claim 5, wherein:
the indication relates to the subject telecommunications device indicates a status relating to an external port of the subject telecommunications device by indicating output of a signal from the first telecommunications device having one of a wavelength and other signal characteristic corresponding to the respective external port of the subject telecommunications device.

7. The telecommunications apparatus according claim 1, wherein correspondence between the indication relating to the subject telecommunications device, and changes in illumination state of the plurality of light sources, changeable via an interface one of:
either at or in communication with the first telecommunications device; and
at a computing apparatus independent from the first telecommunications device.

8. The telecommunications apparatus according to claim 1, wherein the indication relating to the subject telecommunications device is an indication that a connector requires connection to, or disconnection from, a particular external port of the subject telecommunications device, as indicated by a light source from among the plurality of light sources.

9. The telecommunications apparatus according to claim 8, wherein the indication relating to the subject telecommunications device is an indication that a connector requires connection to, or disconnection from, a particular external port of the subject telecommunications device, and is a response to a connection to, or disconnection from, a corresponding external port of the first telecommunications device.

10. The telecommunications apparatus according to claim 1, wherein the indication relating to the subject telecommunications device is an indication of a status of the subject telecommunications device.

11. The telecommunications apparatus according to claim 1, wherein the lighting apparatus is arranged such that a change in illumination status of each of the plurality of light sources is arranged to provide a visual indication on a different region of the subject telecommunications device, and each of the regions is aligned with a different external port of the subject telecommunications device.

12. The telecommunications apparatus according to claim 11, wherein:
the indication relates to the subject telecommunications device indicates a status relating to an external port of the subject telecommunications device by indicating output of a signal from the first telecommunications device having one of a wavelength and other signal characteristic corresponding to the respective external port of the subject telecommunications device.

13. The telecommunications apparatus according to claim 1, wherein correspondence between the indication relating to the subject telecommunications device, and changes in illumination state of the plurality of light sources, changeable via an interface one of:
either at or in communication with the first telecommunications device; and
at a computing apparatus independent from the first telecommunications device.

14. The telecommunications apparatus according to claim 13, wherein:
the interface is a graphical user interface on one of:
a display unit connected to the first telecommunications device;
a device in communication with the first telecommunications device; and
a computing apparatus independent from the first telecommunications device; and
the configuration via the interface comprises identifying one of a part number and a model number of the subject telecommunications device.

15. The telecommunications apparatus according to claim 1, wherein the plurality of light sources are mounted on a substrate, and the substrate is adapted for direct attachment to the second telecommunications device, such that each of a series of external ports on the second telecommunications device aligns with one or more light sources from among the plurality of light sources.

16. The telecommunications apparatus according to claim 1, wherein the plurality of light sources is one or more projectors configured to controllably illuminate a different respective region of the subject telecommunications device.

17. The telecommunications apparatus according to claim 1, wherein the first telecommunications device comprises an input for receiving electrical power from a power source, and further comprises one or more components configured to consume the received electrical power.

18. A method for the control of a telecommunications apparatus,
the telecommunications apparatus comprising:
a plurality of light sources, an illumination state of the light sources being controllable according to control signals;
circuitry connected to the plurality of light sources, the circuity being configured to provide electrical power, and control signals to the light sources; and
a plug connected to the circuitry, the plug being configured to connect to an external port of a first telecommunications device, and configured as an interface for electrical power from the first telecommunications device to the circuitry, and for control signals from the first telecommunications device to the circuitry;
the method comprising:
arranging the plurality of light sources such that a change in illumination state of the plurality of light sources provides a visual indication on a subject telecommunications device, the subject telecommunications device being a second telecommunications device, separate from the first telecommunications device, the second telecommunications device being a passive telecommunications device that is not supplied with electrical power; and
initiating issuance of control signals to the plurality of light sources, via the plug, which correspond to an indication, by the plurality of light sources, relating to the subject telecommunications device.

19. A non-transitory computer-readable storage medium storing a computer program which, when executed by a processor causes the processor to perform a method for initiating issuance of control signals to a telecommunications apparatus,
the apparatus comprising:
a plurality of light sources, an illumination state of the light sources being controllable according to control signals;
circuitry connected to the plurality of light sources, the circuity being configured to provide electrical power, and control signals to the light sources; and
a plug connected to the circuitry, the plug being configured to connect to an external port of a first telecommunications device, and configured as an interface for electrical power from the first telecommunications device to the circuitry, and for control signals from the first telecommunications device to the circuitry;
the plurality of light sources are arranged such that a change in illumination state of the plurality of light sources provides a visual indication on a subject telecommunications device, the subject telecommunications device being a second telecommunications device, separate from the first telecommunications device, the second telecommunications device being a passive telecommunications device that is not supplied with electrical power;
the method comprising:
initiating issuance of control signals to the plurality of light sources, via the plug, which correspond to an indication, by the plurality of light sources, relating to the subject telecommunications device.

\* \* \* \* \*